United States Patent [19]

Wessel et al.

[11] Patent Number: 5,065,567
[45] Date of Patent: Nov. 19, 1991

[54] LAWN EDGER
[76] Inventors: Lloyd F. Wessel, 2810 Meadow Dr., Louisville, Ky. 40220; Edward O. Wessel, 216 Dorchester Rd., Louisville, Ky. 40223; MaryAnn Mudd, 104 Bellemeade Rd., Louisville, Ky. 40222
[21] Appl. No.: 595,210
[22] Filed: Oct. 10, 1990
[51] Int. Cl.⁵ ............................................ A01D 31/00
[52] U.S. Cl. ..................................... 56/13.7; 56/256; 172/13
[58] Field of Search ..................... 56/13.7, 15.7, 256; 172/13, 14

[56] References Cited

U.S. PATENT DOCUMENTS

| | | |
|---|---|---|
| 117,485 | 7/1871 | Tournier . |
| 1,010,260 | 11/1911 | Hill . |
| 1,065,946 | 7/1913 | Janson . |
| 1,181,281 | 5/1916 | Albert . |
| 1,561,823 | 11/1925 | Bishop . |
| 1,654,574 | 1/1928 | Brown . |
| 1,720,169 | 7/1929 | Cripe . |
| 1,732,308 | 10/1929 | Livingston . |
| 1,763,339 | 6/1930 | Beck . |
| 1,770,434 | 7/1930 | Schleicher . |
| 2,270,649 | 1/1942 | Corley . |
| 2,483,935 | 10/1949 | Ridenour . |
| 2,506,366 | 5/1950 | Korn . |
| 2,525,944 | 10/1950 | Ralston . |
| 2,608,043 | 8/1952 | Berdan . |
| 2,663,137 | 12/1953 | Asbury . |
| 2,682,825 | 7/1954 | Warholoski . |
| 2,707,858 | 5/1955 | Norton et al. . |
| 2,718,838 | 9/1955 | Schumacher . |
| 2,725,813 | 12/1955 | Stoeber . |
| 2,791,875 | 5/1957 | Faas . |
| 2,901,878 | 9/1959 | Johnson . |
| 2,906,080 | 9/1959 | Light, Sr. . |
| 2,917,890 | 12/1959 | Thomas ............................. 56/13.7 |
| 3,003,301 | 10/1961 | Koon . |
| 3,019,844 | 2/1962 | Key . |
| 3,053,035 | 9/1962 | Earley . |
| 3,057,411 | 10/1962 | Carlton . |
| 3,097,703 | 7/1963 | Alvik . |
| 3,123,964 | 3/1964 | Schwartz et al. . |
| 3,125,165 | 3/1964 | Boudreaux et al. . |
| 3,130,793 | 4/1964 | Allegretti . |
| 3,150,720 | 9/1964 | Hartnett . |
| 3,188,788 | 6/1965 | Legge ................................ 56/13.7 |
| 3,192,693 | 7/1965 | Bergeson . |
| 3,210,089 | 10/1965 | Hoffman et al. . |
| 3,322,201 | 5/1967 | Ballister . |
| 3,346,053 | 10/1967 | Allegretti . |
| 3,357,497 | 12/1967 | Simolka . |
| 3,404,520 | 10/1968 | Doliton et al. . |
| 3,421,300 | 1/1969 | Rhodes . |
| 3,475,887 | 11/1969 | Price . |
| 3,489,225 | 1/1970 | Bass . |
| 3,531,922 | 10/1970 | Hansen ............................... 56/13.7 |
| 3,668,845 | 6/1972 | Parker ............................... 56/11.6 |
| 3,690,384 | 9/1972 | Patterson .......................... 172/15 |
| 3,698,165 | 10/1972 | Keesee ............................... 56/11.4 |
| 3,710,563 | 1/1973 | Polette et al. ..................... 56/16.9 |
| 3,734,196 | 5/1973 | Mangum ............................ 172/16 |
| 3,803,818 | 4/1974 | Chaney ............................... 56/11.6 |
| 3,907,039 | 9/1975 | Remley et al. ..................... 172/15 |
| 3,907,040 | 9/1975 | Trusty ................................. 172/15 |
| 4,170,099 | 10/1979 | Owens ................................ 56/16.9 |
| 4,200,155 | 4/1980 | Mullet et al. ...................... 172/14 |
| 4,318,267 | 3/1982 | Green .................................. 56/13.7 |
| 4,321,785 | 3/1982 | Kaland . |
| 4,453,372 | 6/1984 | Remer ................................ 56/13.7 |
| 4,463,544 | 8/1984 | Carsello et al. ................... 56/17.1 |
| 4,478,028 | 10/1984 | Dawson, Jr. ....................... 56/16.9 |
| 4,551,967 | 11/1985 | Murcko .............................. 56/13.7 |
| 4,589,252 | 5/1986 | Williams ............................ 56/255 |
| 4,642,976 | 2/1987 | Owens ................................ 56/16.9 |
| 4,718,221 | 1/1988 | Wessel et al. ..................... 56/16.9 |
| 4,896,488 | 1/1990 | Duncan et al. .................... 56/13.7 |
| 4,949,536 | 8/1990 | Neufeld .............................. 56/13.7 |
| 4,965,990 | 10/1990 | Slawson, Sr. et al. ............. 56/13.7 |

FOREIGN PATENT DOCUMENTS 2107163A 10/1981 United Kingdom .

Primary Examiner—William P. Neuder
Attorney, Agent, or Firm—Wood, Herron & Evans

[57] ABSTRACT

An improved lawn edger encludes an edging disk mounted for straight line adjustment, on the wheel axle of a lawn mower, between stowed and operative positions. One-handed operation moves the edger between these positions and, additionally, totally removes the edger for close-in mowing. The operating handle extends above the mower deck for ease of operation, while the apparatus minimizes undue tortional forces on the wheel axle.

30 Claims, 3 Drawing Sheets

LAWN EDGER

This invention relates to lawn edging and trimming apparatus early to an improved lawn edging and trimming apparatus for mounting on a lawn care apparatus such as a lawn mower.

Lawn mower mounted lawn edging and trimming apparatus are disclosed in two prior U.S. Pat. Nos. 4,718,221 and 4,852,658, each of which are incorporated herein by reference. In the latter of these, there is disclosed a lawn edging disk movable between stored and operational positions about the wheel axle of a mower. The disk is mounted on apparatus secured to the axle for swinging the disk thereabout, upwardly and rearwardly to store it, and forwardly and downwardly to extend it below the mower wheel for edging.

While the apparatus of these two prior patents are useful, it has been desirable to provide an improved apparatus having additional advantages.

For example, we have determined that use of a larger cutting disk than in the prior patents will make edging and trimming much easier. A larger disk will provide a more acute cutting angle for the turf, making more efficient use of the available cutting force and inertia of the mower. However, the size of the disk in U.S. Pat. No. 4,852,658 is limited due to the potential interference of the disk in storage position with the grass chute.

Also, with prior patents noted, a two-part disk guard is shown; one component telescoping into and out of the other. It is now desired to provide a single-piece guard, functional to cover the disk when stored and when operating, not an integral part of the edger operating mechanism and being quickly and easily removable.

In U.S. Pat. No. 4,852,658, adjustment of the disk between its operating and stored position requires manipulation and rotation of a short adjusting arm in a circular direction. This requires manipulation by hand near the edger disk and the lawn mower wheel. It is now desired to improve the operation of an edging and trimming apparatus from a location more remote from the disk and from the underside of the mower, for example.

Accordingly, it is an objective of this invention to provide an improved edging and trimming apparatus for facilitating the trimming operation by accommodating a larger disk than prior trimmers for similar mowers.

Another objective of the invention is to provide an extensible edging and trimming apparatus with a single, dual function guard operable to effectively cover the edging disk in both its stored and operable positions.

Another objective of the invention has been to provide an extensible edging disk for a lawn mower and which can be manipulated by hand between stored and extended positions from a position substantially above the mower wheel.

A still further objective of this invention has been to provide improved apparatus for mounting an edging disk on the wheel axle of a lawn mower.

In another aspect of the invention, it is recognized that the extension of the edger beyond the wheel of the mower may interfere with the ability to position the mower close to obstructions for up-close mowing.

Accordingly, it is a further objective of the invention to provide an improved axle mounted edger disk for a lawn mower which can be easily removed therefrom to facilitate close-in mowing, such as around dense shrubbery.

It is yet a further objective of the invention to provide an improved edger disk apparatus for facilitating retrofit thereof to existing mowers without prior edging capacity.

To these ends, a preferred embodiment of the invention comprises an edging disk rotatably mounted to a plate slidably mounted in a receiver channel which is secured to the axle of a lawn mower. The disk is reciprocated in a generally vertical and linear direction between a rearward stored position and a more forward, lower extended position, below the lawn mower wheel, and near the forwardmost extension thereof. A slide plate latch extends upwardly above the disk and mower deck where it can be grasped, moved outwardly to unlatch the disk and then pushed downwardly in a straight line to lower the disk for edging. A single-piece disk guard covers the disk when it is stored. When the disk is lowered, it extends below the guard for edging, but the guard still covers and protects a substantial part of the upper edge of the disk, and is also easily removed so the disk can be removed where desirable for close-in mowing.

Preferably, the motion of the disk between stored and operative positions is linear along a path which is preferably at least slightly inclined from the vertical. Retraction moves the disk upwardly and rearwardly, respecting the mower's wheel axle, while extension moves the disk downwardly and forwardly.

As a result, a larger disk than disclosed in U.S. Pat. No. 4,852,658 can be used on the same mower, since this motion provides additional disk clearance, with respect to the mower's grass chute, when mounted on that side of the mower. The disk is moved linearly, rather than swinging rearwardly toward the chute.

Such a large disk, when its bottom edge is extended below the wheel the same distance as the prior patented disk apparatus, provides a more acute cutting angle when the disk engages the turf to be cut. This renders the cutting more efficient, wherein the force provided by the mower's weight and inertia is more effective in a downward, cutting direction than with the smaller disk's less acute, more forwardly directed cutting edge.

In yet another aspect of the invention, it should be appreciated that the invention facilitates mounting of the edger disk without overstressing the axle bolt threads when the disk is in use. To this end, it will be appreciated that when the disk is extended, a force operates on the outer, lowermost edge of the disk. This force tends to rotate the slide plate and channel in a counterclockwise direction about the wheel axle. At the same time, the forward motion of the disk is opposed by the cutting action in a force vector which tends to rotate the slide plate and receiver channel in a clockwise direction about the wheel axle. These forces tend to cancel out or at least minimize each other so there is no undue torque affecting the axle bolt as may tend to strip out the bolt threads.

Moreover, the slide plate and latch is operable so that when the latch is released, it is possible to simply withdraw the plate, latch and disk from the receiver channel, thus removing the disk from the mower to accommodate its mowing use close to obstructions.

The disk guard is a single piece having a releasable detent secured to the receiver channel. When the detent is released, the guard is also removed so the disk can be demounted as noted above.

These objectives and advantages will become even more readily apparent from the following detailed written description of the invention, and from the drawings in which.

Figure 1:
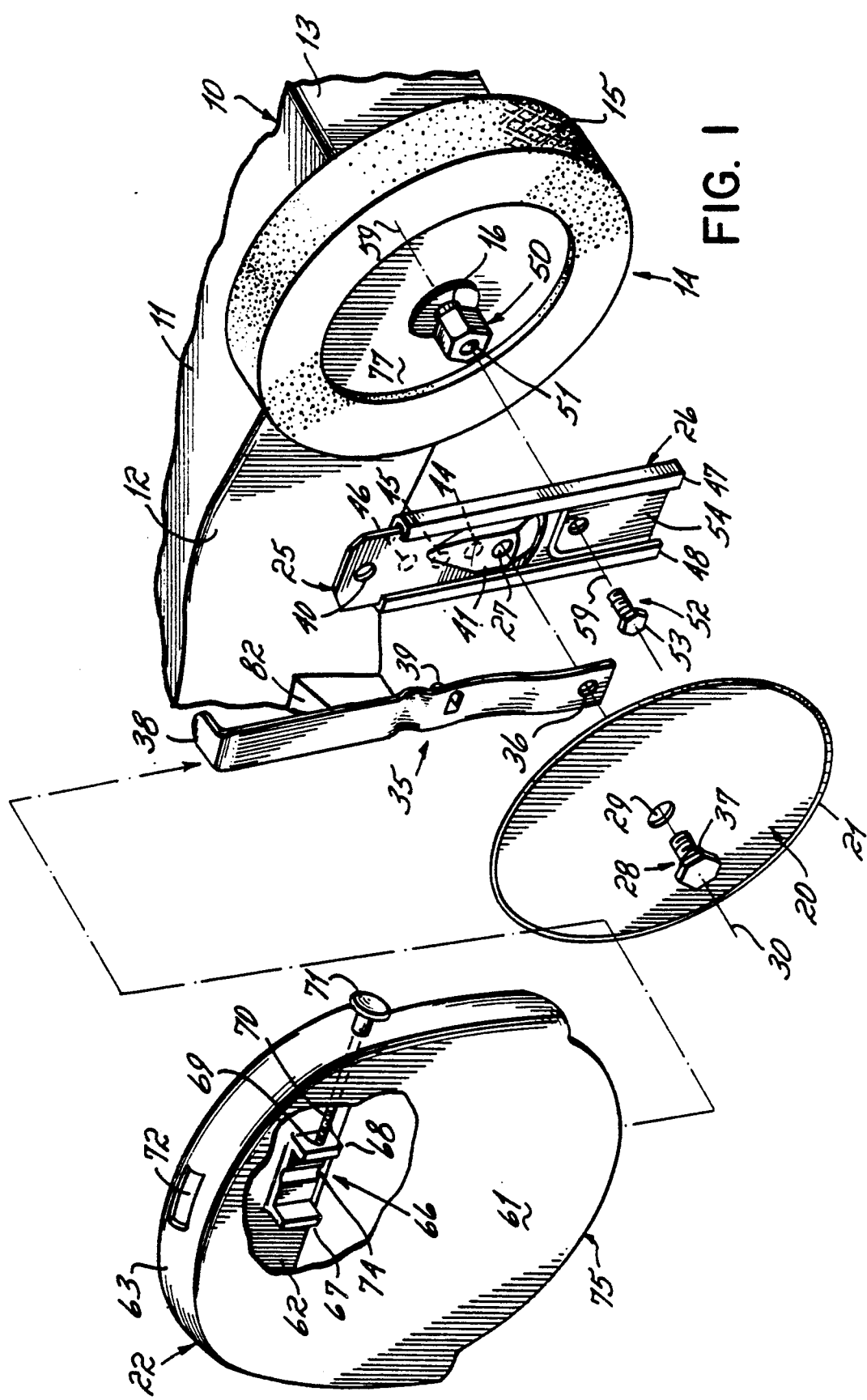
FIG. 1 is a partially exploded view showing components of a preferred embodiment of the invention.
Figure 6:
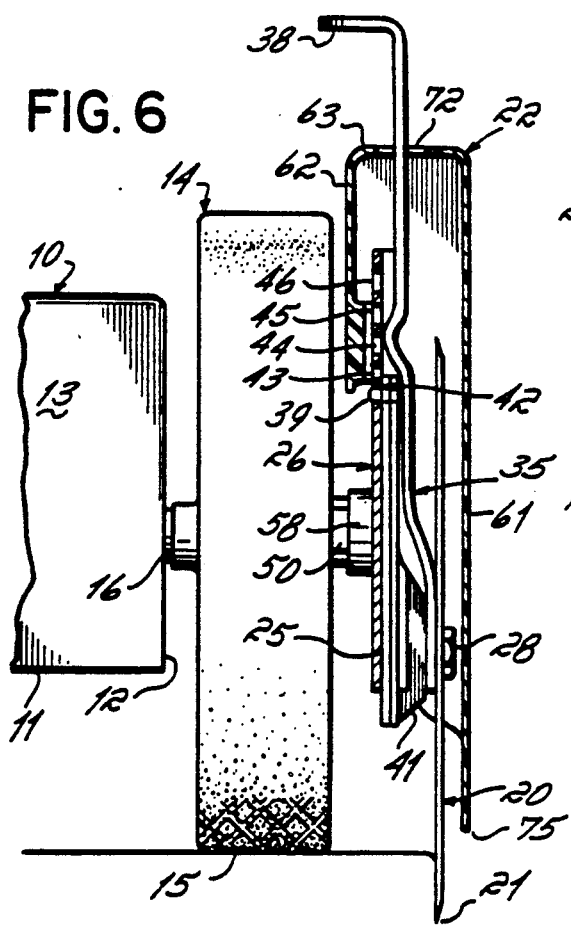
FIG. 6 is a cross-sectional view taken along lines 6—6 of FIG. 5.
Figure 7:
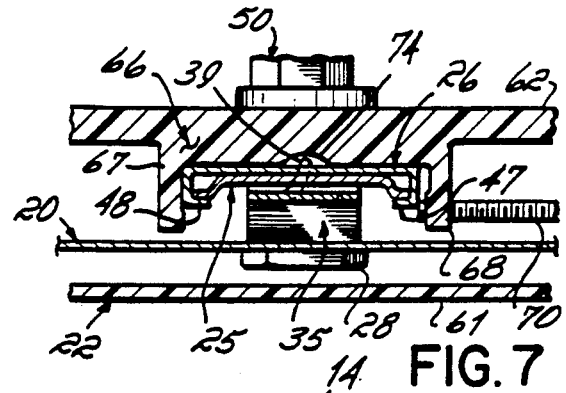
FIG. 7 is a partial cross-sectional view taken along lines 7—7 of FIG. 4.

Turning now to the drawings, the various parts thereof are perhaps best seen in FIGS. 1-3 and 7. In FIG. 1 the various parts are shown in partially exploded form. A lawn care vehicular apparatus such as a lawn mower 10 is shown, having a deck 11, a sidewall 12 and a frontwall 13. The lawn mower is provided with a wheel 14, having a circumferential tread 15. The wheel is mounted on axle 16 (FIG. 6), which comprises, according to this invention, a shoulder bolt screwed into the sidewall 12 or some fitment thereof. Alternatively and as will be described, the axle or shoulder bolt 16 may comprise a stub shaft permanently secured to the sidewall 12. Returning now to FIG. I, the lawn mower 10 is provided with a turf or lawn trimming and edging apparatus, including edging disk 20. Disk 20 has preferably a sharpened circumferential edge 21 for trimming and edging turf. A guard or shroud 22 is provided for covering the disk 20 in both its stowed and extended positions as will be described. Also included in FIG. 1 are various elements and components for removeably mounting the disk 20 on the axle 16 for, in one position, edging the lawn or turf over which the mower rolls and in another position wherein the disk is simply stowed. The apparatus for mounting the disk 20 includes a slide plate 25 and a slide receiving channel or means 26 (FIG. 7). The slide plate 25 is provided with a bore 27 for receiving a shoulder bolt 28. Shoulder bolt 28 extends through the disk 20 and is threaded into the threaded bore 27 of slide plate 25 for securing the disk thereto, such that the disk is free to rotate about bolt 28, the bolt 28 extending through aperture 29 in the disk, thus mounting the disk on a disk axis 30. Accordingly, it will be appreciated that as the slide plate 25 moves up and down within the receiver channel 26, the disk also moves linearly with respect to the channel 26. A yieldable or spring-like latch arm 35 includes an aperture 36 at the lower end thereof for receiving shoulder bolt 28. The shoulder 37 of the shoulder bolt 28 extends through the aperture 29 in the disk 20 and engages the latch arm 35 about the aperture 36 therein, to thereby tighten the latch arm 35 against the slide plate 25 and hold it securely with respect thereto. The latch arm 35 is extended upwardly and terminates in a handle 38.

Handle 38 is positioned well above mower deck 11 and preferably comprises a bent-over tab extending perpendicularly from arm 35 to facilitate manipulation. This bend is sufficient for grasping and actuating latch arm 35, and yet small enough to fit through shroud aperture 72 when removing shroud 22. It also serves as a safety tab to prevent slide plate 25 from completely falling out of channel 26, should latch arm 35 be accidentally disengaged by shrubbery or other mowing obstacles.

Figure 2:
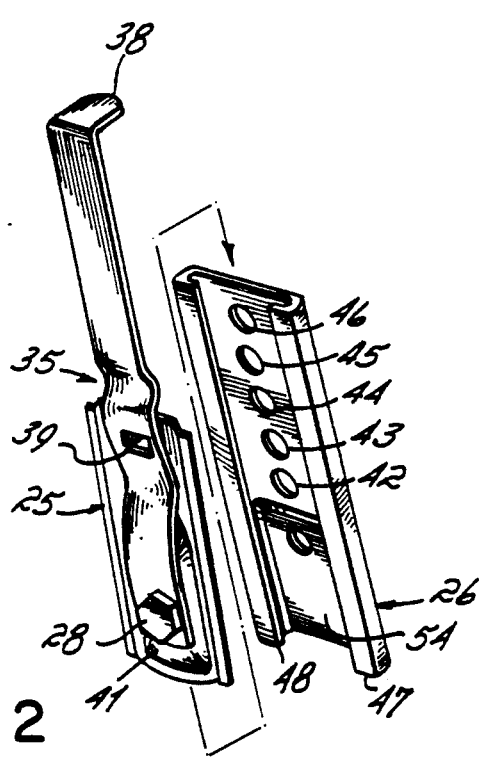
FIG. 2 is an exploded perspective view of the slide plate receiver channel and spring latch of FIG. 1.
Figure 3:
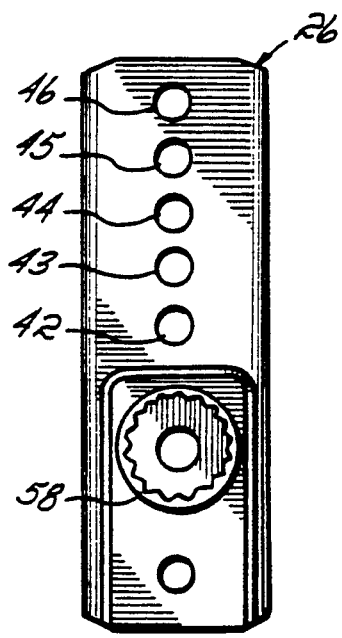
FIG. 3 is a plan view of the rear of the receiver channel and multi-point socket of FIG. 1.

Between the aperture 36 and the handle 38, the latch arm is provided with a turned out latching tab 39, which extends toward the slide plate 25 and through the tab-receiving aperture 40 therein. Slide plate 25 is provided with a convex protrusion 41, extending toward the disk 20 as perhaps best seen in FIG. 6. This provides a lateral separation between the slide plate 25 and the disk 20 so that the latch arm or spring arm 35 can be moved in a direction toward or away from the mower in the area between the slide plate 25 and the disk 20. It is also best seen in FIG. 6 the natural position of the latch or spring arm 35, as shown with the latch tab 39 extending through the tab receiving aperture 40 and into one of a plurality of apertures 42–46, three of which are shown in FIG. 1 and all five of which are shown in FIGS. 2 and 6.

It will be appreciated that when the latch tab 39 extends through aperture 40 of slide plate 25 and one L of the apertures 42–46 in the receiving channel 26, that the slide plate 25 is effectively locked in position with respect to the receiving channel 26. In this regard, it will be appreciated that receiving channel 26 has inwardly turned flanges 47 and 48, which capture the slide plate 25 within the channel 26.

In order to mount the disk 20 on the mower 10, the axle 16 as noted above, comprises a shoulder bolt having, for example, a hexagonal head 50 comprising a plurality of flats therearound. The shoulder of the bolt 16, of course, is extended and has an outer circumferential surface providing the axle for the wheel 14 with the distal end of the shoulder toward the mower 10, secured against the wall 12. The head 50 is provided with a bore 51, which is threaded for receiving bolt 52, extending through the receiver channel 26 and into the head 50, for securing the receiver 26 and the components attached thereto to the distal end of the axle 16. Bolt 52 has a flattened head 53, which is disposed within a relieved or concave area 54 in receiver channel 26, so that the head 53 of the bolt 52 does not interfere with the sliding motion of slide plate 25 within the receiver channel 26.

A multi-point socket-like protrusion 58 (FIG. 3) extends toward the mower from the receiver channel 26. The protrusion 58 has internal flats or coins for receiving the multi-faceted head 50 of the axle or shoulder bolt 16. The socket 58 is an integral part of the receiver channel 26, or may be, for example, a weldment thereon, which envelops the head 50 and when so secured, prevents turning of the receiver channel 26 and the apparatus associated therewith about the axis 59 of the axle 16 and wheel 14. The socket 58 may, for example, have an internal area corresponding to that of a 12 point socket and is thus capable of securing the receiver channel 26 and slide plate 25 on the head 50 in a plurality of positions, approximately 30 degrees apart.

Accordingly, the angular position of the longitudinal extension of the channel 26 and slide plate 25 is dependent on the final angular disposition of the head 50 of bolt 16, when it secures the wheel 14 on the mower 10, and the orientation of the respective points of the socket 58 with respect to the hexagonal head 50. Of course, once the slot socket is slipped over the head 50, the bolt 52 is tightened to secure the channel 26 and slide plate 25 in a fixed angular position with respect to the axis 59.

Figure 4:
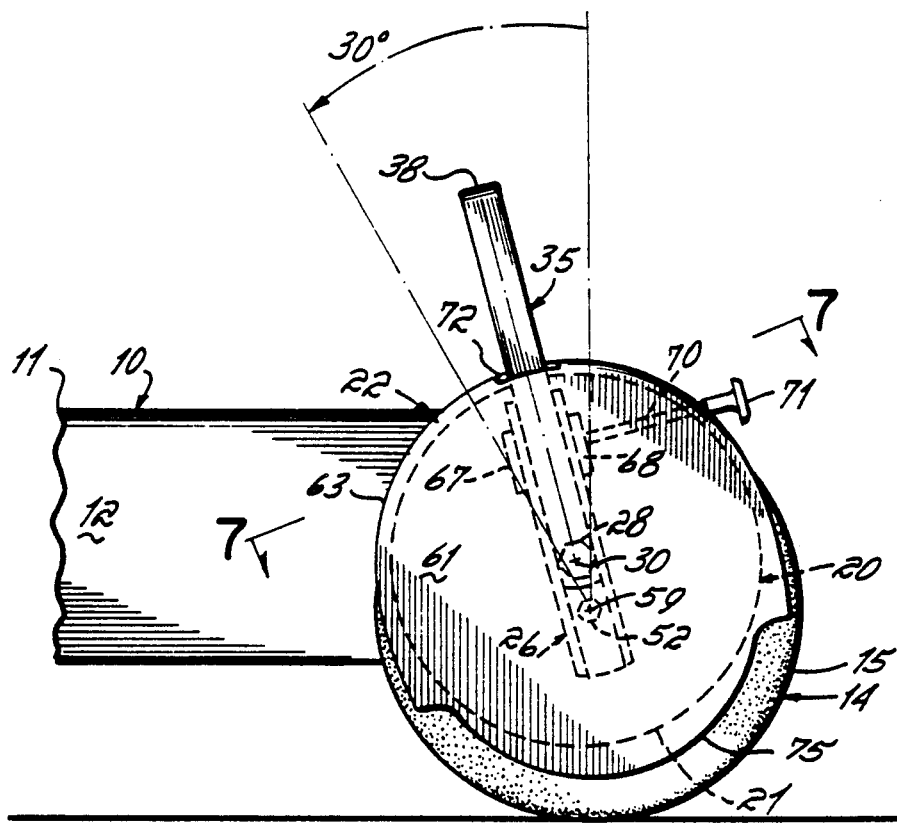
FIG. 4 is a side view showing the edger in retracted, stored condition.
Figure 5:
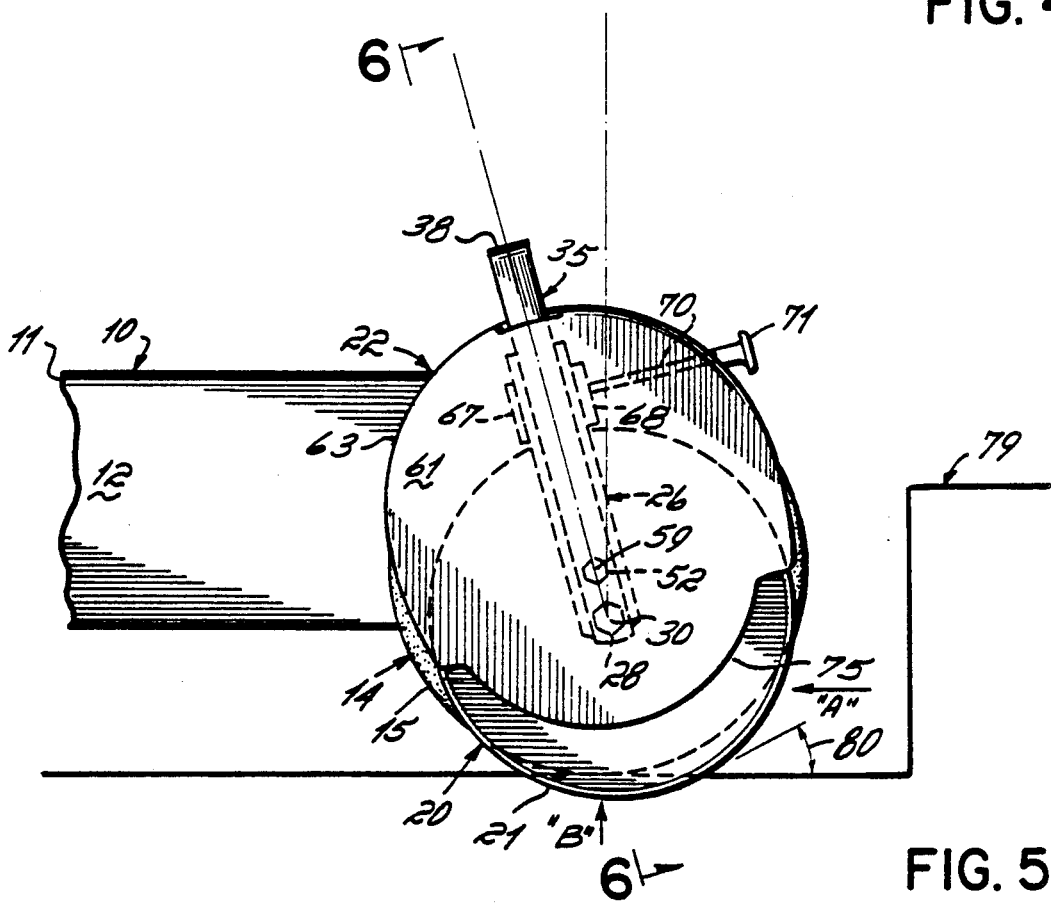
FIG. 5 is a view similar to FIG. 4 but showing the edger in extended edging position.

As indicated in FIGS. 4 and 5, for example, the channel 26 and slide plate 25 extend in a direction which is slightly inclined from the vertical. Preferably this inclination is 30 degrees from the vertical, but could be at other inclinations such as, for example, within the range of 15 degrees to 45 degrees from the vertical. Channel 26 and plate 25 may be inclined at a greater angle or at a lesser angle, depending on the result desired and the particular configuration of the mower or lawn care vehicle with which the edging apparatus described herein is used.

Continuing now with the description of the components of the apparatus in FIG. 1, it will be appreciated that shroud 22 has an outer wall 61 and an inner wall 62, with a peripheral wall 63 there between and generally surrounding the disk 20 in use. The inner wall 62 is provided with a channel 66 having outwardly extending flanges 67 and 68 spaced apart from each other as the width of the receiver channel 26. Flange 68 contains a threaded bore 69 for receiving a detent screw 70 extending outwardly of the peripheral wall 63 to the manipulable knob 71.

The top of the peripheral wall 63 is provided with an aperture 72 which can be slipped over the handle 38 and the spring or latch arm 35 as the shroud is assembled to the unit in a downward direction, so that the shroud covers the disk 20 and so that the handle 38 extends upwardly, both above the disk 20 and above the deck 11 of the mower 10. Once the shroud is in the proper position, the knob 71 is twisted to advance the detent screw 70 through the flange 68 and engage the receiver channel 26 to hold the shroud in place. Of course, the channel 66 can be made as an integral portion of the shroud 22 as shown in FIG. 7 or can be added thereto.

The shroud 22 has an open lower end 75, through which the disk 20 can be extended, which will be discussed. Nevertheless, when the disk 20 is in its raised or stowed position, the shroud 22 substantially covers the entire disk and its edge.

With further attention to the shroud 22, the channel 66 therein is provided with a relieved area 74, corresponding to a longitudinal path along the apertures 42-46, such that the channel 66 does not interfere with the extension of the latch tab 39 through the slide plate 25 and the receiver channel 26 (FIG. 7) and the flanges 67 and 68 may also have inward concave areas as shown in FIG. 7 for receiving the peripheral edges of the receiving channel 26.

As noted above in an alternative embodiment, the axle 16 may comprise a stub shaft permanently secured to the mower 10. When such a stub shaft is used, the outer end area is threaded and a head or nut which has an outer configuration such as the head 50 of the axle 16, has a through bore there through. This nut is threaded onto the threaded end of such a stub shaft for securing the wheel 14 to the mower and accommodates the non-rotational mounting of the slide plate 25 and receiver channel 26 with respect to the axle of the mower. It will also be appreciated that the length of the head 50 or of the hexagonal nut on any stub shaft axle is of such a dimension to accommodate any concavity, such as that shown at 77 in wheel 14 for example. Turning now to FIGS. 4 and 5, it will be appreciated that FIG. 4 depicts the edger apparatus in a stowed position. In this position, the latch arm 35 has been moved outwardly from the mower to pull the latch tab 39 from the latch-receiving aperture 40 and from the aperture 42, 43, 44, 45 or 46 in which it resides. In this extended position, the handle 38 can be pushed downwardly or pulled upwardly, lifting the slide plate 25 within the receiver channel 26 and as well lifting the disk 20 along with it. As shown in FIG. 4, the disk 20 is in a stowed position with the confines of the shroud 22. In this position, the latch tab 39 extends through the aperture 40 and slide plate 25 and into the upper positioning aperture 46 of the receiver channel 26. In this position, it will be appreciated that the disk axis 30 is located above and rearwardly of the axis 59 of the axle 16 and wheel 14. It will also be appreciated that in this embodiment, the disk axis 30 is disposed on a radial extending from the axis 59. Turning now momentarily to FIG. 5, it will be appreciated that the latch arm 35 has been moved outwardly toward the disk and handle 38 pushed downwardly, carrying the slide plate 25 and the disk 20 downwardly, to position the disk 20 in a cutting position with respect to the ground as shown in the figures. In such a position, the sharpened edge 21 of the disk 20 extends below the ground surface on which the mower wheel 15 supports the mower. Thus, the disk 21 extends downwardly below the level of the ground line or sidewalk, for example, to trim any grass or turf which extends from the lawn, for example, over the pavement. It will be appreciated in this position, that the axis 30 has now been moved downwardly and forwardly of the axis 59 of the axle 16 so that the forwardmost portion of the sharpened edge 21 of the disk 20 is approximately in the same vertical disposition as the forwardmost portion of the tread 15 of the wheel 14. Thus, edging can be accomplished right up to an object, for example, shown in 79 in FIG. 5.

Also it will be appreciated that in the extended position, the angle at which the sharpened edge 21 meets the turf at the level of the ground line, for example, is a very acute angle 80, relative of course to the angular disposition of the axis 30 with respect to the axis 59 and the size of the disk. As the size of the disk increases, for example, the angle 80 is reduced further. As this angle reduces or becomes more acute, the actual cutting efficiency of the disk with respect to the turf to be edged or trimmed, is rendered more efficient, and thus the inertia and the weight of the mower is more effectively used for edging.

It will be appreciated, of course, that this edging apparatus can be utilized with either a pushed or a self-propelled mower and in a preferred embodiment, is utilized in connection with a self-propelled mower 10. It will also be appreciated, however, that the disk 20 is not driven but is free to rotate and that the weight and inertia of the rotary mower 10, whether of the walk behind, push variety, or the self-propelled variety, is sufficient to effectively cause the disk 20 to cut and edge turf extending over the sidewalk or other area along which the mower is pushed.

Turning now momentarily to FIG. 1, it will be appreciated that the mower 10 includes a grass chute 82, only a portion of which is seen in FIG. 1. This chute comprises a protrusion out beyond the sidewall 12 and as shown, constitutes a leading portion of the grass chute or a simple enlargement of the mower deck 11 through which the rotary mower blade passes. Accordingly, it will be appreciated that the rotary mower 10 produces a vacuum zone, defined in part by the deck 11 and the various walls of the deck and rotating blade, so as to suck up grass clippings cut by the mower. It will be appreciated that the disk 20 being located on the end of the axle 16, is either within or just proceeds the vacuum zone defined by the mower so that as the disk 20 cuts or edges turf and grass and the mower is rolled over that cut area, the vacuum zone will tend to lift or pick up the cuttings and blow them outwardly through the chute 82 or into the grass catcher associated with the mower.

It will also be appreciated that on many mowers, the front wheel 14 is relatively closely associated with the enlargement of the deck 11 or the grass chute 82. In this regard and when an edging disk is mounted on the end of the front wheel axle, there is a relatively limited area for the disk and the disk size, thus, must be limited. If the disk were rotated about the axle 16 in a circular direction as described in the prior patent noted above, the disk size would even be further limited, since it would be limited to a size which must clear the protrusion 82. In this present invention, however, it will be appreciated that the disk is moved in a linear direction, upwardly and downwardly, and is not swung rearwardly toward the protrusion 82 as in the prior patent. Accordingly, the disk 20 may be of a larger size than the disk shown in the prior patent, when the same mower configuration is contemplated. The use of a larger disk 20 as noted above, facilitates the efficiency of the edging and cutting operation.

It will also be appreciated that the axis 30 of the disk 20 is moved in a linear direction as the disk is moved between its stowed position as shown in FIG. 4 and its extended position as shown in FIG. 5. The axis 30 is not moved in a circular or arcuate direction but rather in a linear fashion, which, in this embodiment, is preferably on a radial, which extends through the axis 59 of the axle 16. It will of course be appreciated that the axis 30 may be located along a line which is not radial to the axis 59 but may be somewhat offset therefrom.

Accordingly, it will be appreciated that we have provided an improved edging apparatus, which can be utilized on original mowing equipment or can be provided as an after-market add-on. When provided in original equipment, the axle 16 of the mower with which the edging apparatus is to be used, can comprise a shoulder bolt having an integral head as particularly shown in the drawings hereto. When provided as an after-market add-on, particularly, for example, with mowers with stub shafts, an elongated, hexagonal nut, for example, can be provided of the proper length for accommodating mounting of the edging apparatus to the mower, or a complete new axle, including a shoulder bolt such as that shown above, can be utilized for those existing mowers which do not use a stub shaft axle but which use an elongated shoulder bolt.

Figure 8:
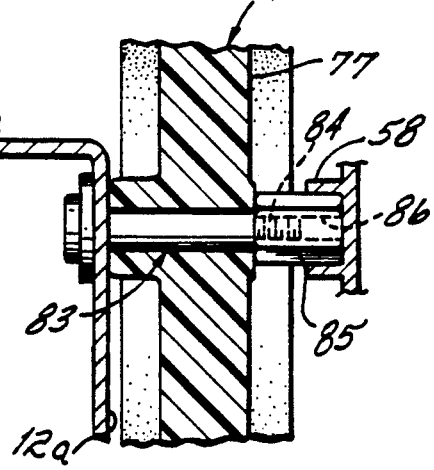
FIG. 8 is a diagrammatic partial cross-section showing a stub shaft axle.

FIG. 8 depicts such a stub shaft axle 83 mounting a wheel 14 secured to a wall 12a of mower 10a. The stub shaft has threaded end 84 into which is secured hexagonal head or nut 85. Nut 85 has a threaded through-bore 86 for receiving the bolt 52 to secure the edging apparatus thereon in non-rotational fashion through socket 58.

For further description of the slide plate, receiver and latch, U.S. Pat. No. 3,210,089 is incorporated herein by reference, although not believed necessary or critical to the disclosure or inventions claimed herein.

In use, of course, the edging disk 20 with its associated mounting apparatus, is mounted to the axle 16 and the shroud is thereafter secured over the disk. It will be appreciated that while closely fitted to the wheel 14, the edging apparatus nevertheless extends somewhat outwardly therefrom. In particularly tight mowing situations, it may be sometimes desirable to remove the apparatus from the mower so that close-in mowing can be obtained. This is easily accomplished by first simply unscrewing the knob 71 (FIG. 1), removing the shroud upwardly over the handle 38 and thereafter moving the latch arm 35 in an outward direction to disengage the latch tab 39 and then pulling on the handle 38 to lift the disk and slide plate 25 from the receiver channel 26 and remove the edging apparatus from the mower. Reassembly is easily accommodated by reverse manipulation. Accordingly, adjustment of the edger disk between its various positions defined by the apertures 42-46, or complete removal or assembly, can be a one-handed operation, it only being necessary to grasp the handle 38 to make these adjustments. Since this handle extends above the deck 11, it is not necessary for a user to place his hand close to the disk edge or to the underside of the mower.

In another aspect of the preferred embodiment of the invention, it will be appreciated that many mowers utilize a wheel axle bolt having a ⅜ inch by 16 N.C. thread. If all the edging forces are exerted on this thread, it may strip out, requiring repair many mower owners are not equipped to handle. In this invention, and with particular reference to FIG. 5, it will be appreciated that the torque on the wheel axle bolt, during edging, is minimized.

In particular, when the disk 20 is extended and the mower driven or pushed for edging, a force (arrow A - FIG. 5) acts on the disk in a generally rearward direction. This tends to turn the axle bolt 16 in a clockwise direction (FIG. 5) through slide plate 25 and receiver 26. At the same time, the disk 20 is forced downwardly by the mower into the turf and a force (arrow B - FIG. 5) operates in an upward direction on the disk. This force acts through slide plate 25 and receiver 26 to tend to turn axle bolt 16 in a counterclockwise direction. This confluence of forces tends to either cancel each other out, or to minimize the resultant force such that a small resultant torque is applied to axle bolt 16 than may otherwise occur in a different structure. This minimization of resultant torque also applies to threads 84 of stub shaft 83 and the mating threads 86 of nut 85. This combination of elements thus renders this invention highly desirable from the standpoint of practical usage, reliability and useful lifetime, particularly as an after-market item where the axle bolts were not originally designed to sustain the total, uni-directional torque executed by prior, axle-mounted edgers.

It will be appreciated that other advantages and modifications can be provided without departing from the scope of this invention and the applicants intend to be bound only by the claims appended hereto.

We claim:

1. Turf edging apparatus including in combination, a wheeled lawn mower having a frame, a non rotational front axle and a front wheel mounted thereon, said front wheel having a circumferential tread for rolling engagement with a surface over which the lawn mower can be rolled, an edging disk having a turf cutting edge, arm means mounting said edging disk on said axle for selective linear movement with respect to said axle, said disk having a disk axis, said disk axis being radially spaced from said axle and adjustable in a linear direction about said axle independently of said frame, said disk being rotatable about said disk axis, said disk being movable between a stowed position above said surface and a deployed edging position wherein said turf cutting edge is disposed beyond the circumferential tread of said front wheel from said axle for edging, and further including means for adjusting the cutting height of said mower with respect to said front axle, and independently of the position of said disk, while maintaining constant the position of said disk with respect to the position of said axle, such that adjustment of the cutting height of said mower does not affect the edging position of said disk.

2. Turf edging apparatus as in claim 1 wherein said disk axis is disposed rearwardly of said axle with respect to said front wheel when said disk is in said stowed position, and below and forward said axle when said disk is deployed in an edging position.

3. Turf edging apparatus including in combination:
a wheeled lawn care apparatus having a frame, a non-rotational front axle and a front wheel mounted thereon, said front wheel having a circumferential tread for rolling engagement with a surface over which the lawn care apparatus can be rolled,
an edging disk having a disk axis and a turf cutting edge,
arm means mounting said edging disk on said axle for selective movement,
said disk axis being radially spaced from and adjustable in a linear direction with respect to said axle and independently of said frame,
said disk being rotatable about said disk axis, said disk being movable between a stowed position above said surface and a deployed edging position wherein said turf cutting edge is disposed beyond the circumferential tread of said front wheel for edging,
wherein said turf cutting edge of said disk is circular, extends circumferentially around said disk and is sharpened, and said apparatus further includes:
a shroud extending around an upper portion of said turf cutting edge and laterally covering said edge,
said disk being extensible outwardly of said shroud when said disk is moved to its deployed edging position, to uncover a portion of said turf cutting edge for an edging operation while said shroud simultaneously covers an upper portion of said disk.

4. Turf edging apparatus including in combination:
a wheeled lawn care apparatus having a frame, a non-rotation wheel mounted thereon, said front wheel having a circumferential tread for rolling engagement with a surface over which the lawn care apparatus can be rolled,
an edging disk having a disk axis and a turf cutting edge,
arm means mounting said edging disk on said axle for selective movement with respect to said axle,
said disk axis being radially spaced from and adjustable in a linear direction with respect to said axle, independently of said frame,
said disk being rotatable about said disk axis,
said disk being movable between a stowed position above said surface and a deployed edging position wherein said turf cutting edge is disposed beyond the circumferential tread of said front wheel from said axle for edging,
wherein said disk axis is linearly movable to positively indexed positions with respect to said wheel axle.

5. Turf edging apparatus including in combination:
a wheeled lawn care apparatus having a frame, at least one non-rotational front axle operably secured in said frame and a front wheel mounted thereon, said front wheel having a circumferential tread for rolling engagement with a surface over which the lawn care apparatus can be rolled,
an edging disk having a disk axis parallel to said axle and having a turf cutting edge,
receiver means secured to said axle, and being
a slide plate slidably received in said receiver means,
said receiver means and said slide plate mounting said edging disk on said axle for selective linear movement with respect to said axle,
said disk axis being radially spaced from, and radially adjustable with respect to said axle, independently of said frame,
said disk being rotatable about said disk axis, said disk being movable between a stowed position above said surface and a deployed edging position wherein said turf cutting edge is disposed beyond the circumferential tread of said front wheel from said axle for edging,
wherein said turf cutting edge has a forward portion extending forwardly of said axle to a position proximate the forwardmost tread of said front wheel when said disk is deployed in an edging position.

6. Turf edging apparatus including in combination:
a wheeled lawn care apparatus having a frame and a non-rotational front axle and a front wheel mounted thereon, said front wheel having a circumferential tread for rolling engagement with a surface over which the lawn care apparatus can be rolled,
and edging disk having a disk axis and a turf cutting edge,
arm means mounting said edging disk on said axle for selective movement with respect to said axle,
said disk axis being radially spaced from, and radially adjustable in a linear direction with respect to said axle, independently of same frame,
said disk being rotatable about said disk axis,
said disk being movable between a stowed position above said surface and a deployed edging position wherein said turf cutting edge is disposed beyond the circumferential tread of said front wheel from said axle for edging,
wherein said lawn care apparatus is lawn mower generating a vacuum zone for sucking up clippings, said edging disk being disposed forwardly of said vacuum zone.

7. An edger comprising in combination:
wheel means, including a circumferential tread, for supporting said edger over a surface,
a non-rotatable axle on which said wheel means is rotatably mounted,
an edging disk, and
means mounting said edging disk on said axle,
said means being linearly movable with respect to said axle,
said disk having an axis spaced radially and parallel to said axle for movement of said disk with respect to said axle between a stowed position above said surface and a deployed edging position operatively below said surface with said axis disposed beneath said axle and with a turf cutting edge of said disk disposed proximate the forwardmost circumferential tread of said front wheel.

8. In combination, a lawn mower and lawn edger apparatus therein comprising:
   a wheel axle extending from said mower,
   a wheel mounted thereon,
   a head on said axle outboard said wheel,
   a slide receiver means having means for non-rotationally securing said receiver means to said head,
   a slide plate slidably and releasably captured in said receiver means for linear motion with respect thereto,
   an edging disk mounted on said slide, and
   to said
   means for releasably latching said slide receiver for selective securement of said slide to said receiver and positioning of said disk in stored and extended operative positions.

9. A lawn mower and lawn edging apparatus wherein said mower has at least one axle and a wheel thereon, and said edging apparatus includes an extensible edging disk, said mower and edging apparatus further comprising:
   means for movably mounting said disk on said axle for movement, with respect to said axle, in a linear direction between stowed and extended edging positions.

10. Apparatus as in claim 9 wherein said mower has a mower deck and said mounting means includes a disk actuating arm extending upwardly above said deck and said disk.

11. Apparatus as in claim 10 wherein said linear movement is along a path disposed angularly counter-clockwise at an angle inclined upwardly and rearwardly from the vertical.

12. Apparatus as in claim 10 wherein said linear movement path is inclined from the vertical.

13. Apparatus as in claim 10 wherein said disk has a disk axis and wherein said linear movement is in a direction inclined from the vertical, said disk axis disposed above and behind said axle when said disk is in a stowed position, and below and forward of said axle when said disk is moved to an extended edging position.

14. Apparatus as in claim 9 wherein said mounting means includes:
   a head on said axle,
   an elongated channel,
   a plate slidably received in said channel,
   said disk being mounted on said plate, and
   socket means on said channel extending over said head and non-rotationally positioning said channel on said head.

15. Apparatus as in claim 14 wherein said axle comprises a shoulder bolt.

16. Apparatus as in claim 14 wherein said axle comprises a stub shaft extending from said mower and said head comprises a nut operably screwed onto an end of said stub shaft.

17. Apparatus as in claim 9 further including affixed guard shroud covering a substantial portion of said disk in both of its positions, said shroud including means for removably securing said shroud to said mounting means.

18. Apparatus as in claim 17 wherein said mounting means is operable to release said disk from said mower upon actuation thereof.

19. Apparatus as in claim 9 wherein said mounting means operably mounts said disk on said axle outboard of said wheel with respect to said mower.

20. Turf edging apparatus for mounting on a wheeled lawn care apparatus having a wheel axle, said edging apparatus comprising:
   an edging disk having a turf cutting edge and a disk axis,
   a slide plate, said disk mounted on said slide plate,
   a mounting element for slidably receiving said slide plate,
   releasable latch means for releasably securing said slide plate in a selected position with respect to said mounting element,
   said slide plate being linearly movable with respect to said mounting element, and
   means for non-rotationally securing said mounting element on said wheel axle.

21. Apparatus as in claim 20 wherein said axle includes a head and said non-rotational securing means includes a socket receiving said head in non-rotational relationship.

22. Apparatus as in claim 20 including a shroud covering said disk, said disk being extensibly therefrom for edging, said shroud including a channel member receiving said mounting element and a detent means for releasably securing said shroud to said mounting element.

23. Apparatus as in claim 20 wherein said latch means includes an actuating arm extending through an upper portion of said shroud.

24. Apparatus as in claim 19 wherein said means for non-rotationally securing said mounting element on said wheel axle is operable to secure said element on an outboard end of said axle.

25. In combination, an edger disk having an axis and apparatus for mounting said edger disk on the axle of a lawn mower, said mounting apparatus including a multiple component means for moving said disk in a rectilinear direction between a stowed position and an extended edging position when said disk is mounted on a mower.

26. The combination of claim 25 wherein said disk axis is movably attached to at least one component of said mounting means for rectilinear movement in a direction inclined from the vertical.

27. The combination of claim 25, including the further combination of a lawn mower and wheel axle wherein said rectilinear direction is inclined from the vertical.

28. The combination of claim 27 wherein tortional forces applied by the disk, when in use, to the wheel axle tend to cancel each other.

29. The combination of claim 27 wherein said disk axis is disposed above and behind the wheel axle when said disk is in a stowed position, and below and forwardly of said wheel axle when said disk is in an extended edging position.

30. Apparatus as in claim 23 wherein said mower has a wheel on said axle and said mounting apparatus is for mounting said disk on said axle outboard of said wheel with respect to said mower.

* * * * *